United States Patent
Long et al.

(10) Patent No.: US 11,411,622 B2
(45) Date of Patent: Aug. 9, 2022

(54) ADAPTIVE CELL SHAPING IN CODEBOOK BASED FULL DIMENSION MULTIPLE INPUT-MULTIPLE OUTPUT COMMUNICATIONS

(71) Applicant: Telefonaktiebolaget LM Ericsson (publ), Stockholm (SE)

(72) Inventors: Jianguo Long, Kanata (CA); Hong Ren, Kanata (CA); Ahmed Nouah, Ottawa (CA); Yongquan Qiang, Ottawa (CA); Israfil Bahceci, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/274,358

(22) PCT Filed: Sep. 10, 2018

(86) PCT No.: PCT/IB2018/056885
§ 371 (c)(1),
(2) Date: Mar. 8, 2021

(87) PCT Pub. No.: WO2020/053620
PCT Pub. Date: Mar. 19, 2020

(65) Prior Publication Data
US 2021/0344390 A1 Nov. 4, 2021

(51) Int. Cl.
*H04B 7/06* (2006.01)
*H04B 7/0456* (2017.01)
(Continued)

(52) U.S. Cl.
CPC .......... *H04B 7/0456* (2013.01); *H04W 16/28* (2013.01); *H04W 24/02* (2013.01)

(58) Field of Classification Search
CPC .. H04B 7/0456; H04B 7/0639; H04B 7/0478; H04W 16/28; H04W 24/02
See application file for complete search history.

(56) References Cited

U.S. PATENT DOCUMENTS 8,792,942 B2 * 7/2014 Oyama ................. H04W 16/28
455/562.1
9,548,529 B1 * 1/2017 Ma ......................... H01Q 21/28
(Continued)

OTHER PUBLICATIONS

International Search Report and Written Opinion dated Mar. 29, 2019 for International Application No. PCT/IB2018/056885 filed on Sep. 10, 2018, consisting of 12-pages.

*Primary Examiner* — Kenneth T Lam
(74) *Attorney, Agent, or Firm* — Sage Patent Group

(57) ABSTRACT

Methods, network nodes and wireless device for setting an electrical tilt of an antenna array toward a distribution of wireless devices are disclosed. According to one aspect, a method includes for each of at least one sector of an area covered by the antenna array, determining a function of precoding matrix indicators, PMIs, received from a plurality of WDs in the sector. The method includes determining a current electrical tilt angle of the sector based on the function of PMIs. The method further includes comparing a difference between the current electrical tilt angle of the sector and a previously determined electrical tilt angle of the antenna array to a first threshold, and setting the electrical tilt angle of the antenna array based on the comparison.

23 Claims, 12 Drawing Sheets

(51) Int. Cl.
H04W 16/28 (2009.01)
H04W 24/02 (2009.01)

(56) References Cited

U.S. PATENT DOCUMENTS

| | | |
|---|---|---|
| 2014/0177744 A1 | 6/2014 | Krishnamurthy et al. |
| 2014/0177745 A1 | 6/2014 | Krishnamurthy et al. |
| 2015/0381247 A1 | 12/2015 | Ko et al. |
| 2016/0050002 A1* | 2/2016 | Wei ................. H04B 7/0617 370/329 |
| 2016/0211954 A1* | 7/2016 | Goransson .......... H04B 7/0626 |
| 2019/0380046 A1* | 12/2019 | Johnson ............... H04W 24/02 |

* cited by examiner

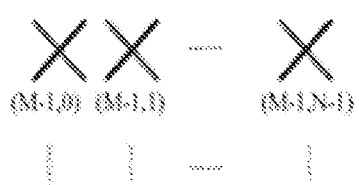
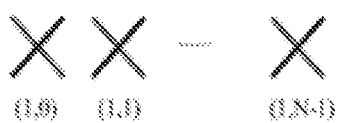
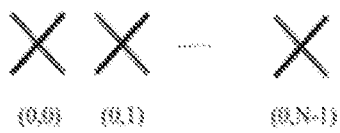
FIG. 1

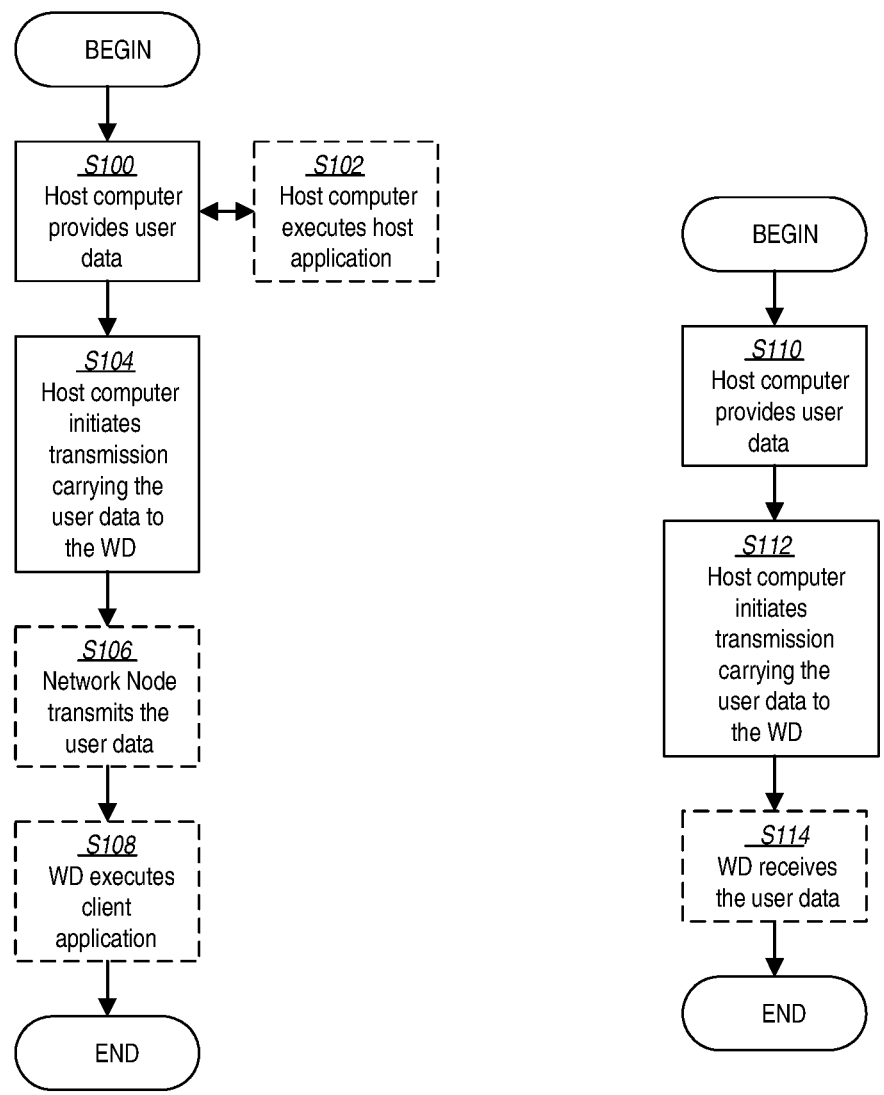

ADAPTIVE CELL SHAPING IN CODEBOOK BASED FULL DIMENSION MULTIPLE INPUT-MULTIPLE OUTPUT COMMUNICATIONS

CROSS-REFERENCE TO RELATED APPLICATION

This application is a Submission Under 35 U.S.C. § 371 for U.S. National Stage Patent Application of International Application Number: PCT/IB2018/056885, filed Sep. 10, 2018 entitled "ADAPTIVE CELL SHAPING IN CODEBOOK BASED FULL DIMENSION MULTIPLE INPUT-MULTIPLE OUTPUT COMMUNICATIONS," the entirety of which is incorporated herein by reference.

TECHNICAL FIELD

This disclosure relates to wireless communication, and in particular to adaptive cell shaping in codebook based full dimension multiple input-multiple output (FD-MIMO) configurations.

BACKGROUND

Elevation beamforming and full dimension MIMO (FD-MIMO) have received increasing attention as a way to improve spectral efficiency and energy efficiency in wireless communications. These features have become part of the Third Generation Partnership Project (3GPP) Long Term Evolution (LTE)-Advanced and Fifth Generation (5G) standards. In an FD-MIMO system, a base station with a 2-dimensional (2D) active antenna array supports multi-user joint elevation and azimuth beamforming (also known as 3D beamforming), which results in much higher cell capacity. When FD MIMO is deployed, the cell shaping in the horizontal and vertical direction may have an impact on the system performance. While horizontal cell shaping usually should ensure an angular coverage and is relatively stable, vertical cell shaping is more impacted by the environment such as surrounding building heights, and wireless device (WD) distributions which can vary over time, e.g., during the day or during night.

Two parameters which have a dominating impact on vertical cell shape are the Half Power Beam Width (HPBW) of vertical channel state information reference signal (CSI-RS) port radiation patterns and electrical tilt. While the vertical HPBW determines an angular span that the network node transmission power will cover, the electrical tilt decides to where the transmit power steers. Conventionally, the electrical tilt is configured by operators with a fixed value. If the electrical tilt is not configured correctly or user distribution varies over time, the boresight of the antenna array will not point to the center of users, or worse, a majority of wireless devices (WDs) will be served by vertical transmission side lobes, which results in poor performance for elevation beamforming.

SUMMARY

Some embodiments advantageously provide a method and system for adaptive cell shaping in codebook based full dimension multiple input-multiple output configurations.

An adaptive approach for elevation cell shaping based on precoding matrix indicator (PMI) feedback of WDs is disclosed herein. The vertical angular distribution of WDs can be obtained by periodically analyzing the PMIs reported by WDs. The electrical tilt can then be adjusted accordingly to point to the majority of WDs to achieve optimal system performance. In cases of multiple vertical virtual sectors, based on the vertical angular distribution of the WDs, vertical sectors can also be removed dynamically if sectors become too close, or new sectors can be created if sectors become too separated.

According to one aspect, a method in a network node for setting an electrical tilt of an antenna array toward a distribution of WDs is provided. The method includes: for each of at least one sector of an area covered by the antenna array, determining a function of precoding matrix indicators, PMIs, received from a plurality of WDs in the sector. The method also includes determining a current electrical tilt angle of the sector based on the function of PMIs. The method also includes comparing a difference between the current electrical tilt angle of the sector and a previously determined electrical tilt angle of the antenna array to a first threshold, and setting the electrical tilt angle of the antenna array based on the comparison.

According to this aspect, in some embodiments, when there is only one sector and the difference exceeds the first threshold, the electrical tilt angle of the antenna array is set to the current electrical tilt angle of the sector. In some embodiments, when the difference exceeds the first threshold, the electrical tilt angle of the antenna array is set to:

$$\max(\min(\bar{\theta^m}, \bar{\theta^{m+1}} - \Delta\theta_{min}), \bar{\theta^{m-1}} + \Delta\theta_{min});$$

where $\bar{\theta^m}$ is the current electrical tilt angle of the current sector, $\bar{\theta^{m-1}}$ is a current electrical tilt angle of an immediately precedent sector, $\bar{\theta^{m+1}}$ is a current electrical tilt angle of a next-subsequent sector and $\Delta\theta_{min}$ is a minimum angular spread between adjacent sectors. In some embodiments, the function of PMIs is one of an average and a median of the PMIs. In some embodiments, a timer is set for each sector to time an evaluation period for receiving the PMIs and determining the current electrical tilt angle for each sector. In some embodiments, when an angular separation between a sector immediately preceding a current sector and a sector immediately subsequent to the current sector is less than a second threshold, the current sector is removed from a group of sectors to which beams are steered. In some embodiments, when an angular separation between two adjacent sectors exceeds a third threshold, a sector between the two adjacent sectors is added. In some embodiments, a beam of a sector is reshaped as a spread between two adjacent distributions of WDs increases. In some embodiments, a beam of a sector is split when a spread between two adjacent distributions of WDs exceeds a fourth threshold. In some embodiments, when a WD is configured with a codebook for which PMI is not reported in a vertical direction, the method further includes switching the codebook configuration during a PMI measuring period to a codebook configuration for which PMI is reported in the vertical direction.

According to another aspect, a network node for setting an electrical tilt of an antenna array toward a distribution of WDs is provided. The network node includes processing circuitry configured to, for each of at least one sector of an area covered by the antenna array, determine a function of precoding matrix indicators, PMIs, received from a plurality of WDs in the sector. The processing circuitry is further configured to determine a current electrical tilt angle of the sector based on the function of PMIs. The processing circuitry is further configured to compare a difference between the current electrical tilt angle of the sector and a previously determined electrical tilt angle of the sector to a first threshold, and set the electrical tilt angle of the sector based on the comparison.

According to this aspect, in some embodiments, when there is only one sector and the difference exceeds the first threshold, the electrical tilt angle of the antenna array is set to the current electrical tilt angle of the sector. In some embodiments, when the difference exceeds the first threshold, the electrical tilt angle of the antenna array is set to:

$$\max(\min(\bar{\theta^m}, \bar{\theta^{m+1}} - \Delta\theta_{min}), \bar{\theta^{m-1}} + \Delta\theta_{min});$$

where $\bar{\theta^m}$ is the current electrical tilt angle of the current sector, $\bar{\theta^{m-1}}$ is a current electrical tilt angle of an immediately precedent sector, $\bar{\theta^{m+1}}$ is a current electrical tilt angle of a next-subsequent sector and $\Delta\theta_{min}$ is a minimum angular spread between adjacent sectors. In some embodiments, the function of PMIs is one of an average and a median of the PMIs. In some embodiments, a timer is set for each sector to time an evaluation period for receiving the PMIs and determining the current electrical tilt angle for each sector. In some embodiments, when an angular separation between a sector immediately preceding a current sector and a sector immediately subsequent to the current sector is less than a second threshold, the current sector is removed from a group of sectors to which beams are steered. In some embodiments, when an angular separation between two adjacent sectors exceeds a third threshold, a sector between the two adjacent sectors is added. In some embodiments, a beam of a sector is reshaped as a spread between two adjacent distributions of WDs increases. In some embodiments, a beam of a sector is split when a spread between two adjacent distributions of WDs exceeds a fourth threshold. In some embodiments, when a WD is configured with a codebook for which PMI is not reported in a vertical direction, the processing circuitry is further configured to cause the WD to switch the codebook configuration during a PMI measuring period to a codebook configuration for which PMI is reported in the vertical direction.

According to another aspect, a computer storage device storing a computer program that, when executed by at least one processor in a network node, performs some methods set forth herein is provided.

According to yet another aspect, a method in a network node for adapting an electrical tilt of an antenna array toward a distribution of WDs is provided. The method includes for each of M sectors, $S_1$ to $S_m$ of an area covered by the antenna array: starting a timer, collecting precoding matrix indicators, PMIs, $X_m$, from a plurality of WDs served by the sector. The method further includes, when the timer expires, calculating a function, $f(X_m)$ of the PMIs, determining a current electrical tilt angle $\bar{\theta^m}$ of the sector based on the function $f(X_m)$, and comparing a difference between the current electrical tilt angle $\bar{\theta^m}$ and a previously determined electrical tilt angle of the antenna array to a threshold. When the difference exceeds the threshold, the method includes setting the electrical tilt angle of the antenna array to:

$$\max(\min(\bar{\theta^m}, \bar{\theta^{m+1}} - \Delta\theta_{min}), \bar{\theta^{m-1}} + \Delta\theta_{min});$$

where $\bar{\theta^m}$ is the current electrical tilt angle of the sector, $\bar{\theta^{m-1}}$ is a current electrical tilt angle of an immediately precedent sector, $\bar{\theta^{m+1}}$ is a current electrical tilt angle of a next-subsequent sector and $\Delta\theta_{min}$ is a minimum angular spread between adjacent sectors.

According to another aspect, a network node for adapting an electrical tilt of an antenna array toward a distribution of WDs. The method includes processing circuitry configured to, for each of M sectors, $S_1$ to $S_m$ of an area covered by the antenna array: start a timer, and collect precoding matrix indicators, PMIs, $X_m$, from a plurality of WDs served by the sector. When the timer expires, the method includes calculating a function, $f(X_m)$ of the PMIs; determining a current electrical tilt angle $\bar{\theta^m}$ of the sector based on the function $f(X_m)$; and comparing a difference between the current electrical tilt angle $\bar{\theta^m}$ and a previously determined electrical tilt angle of the antenna array to a threshold. When the difference exceeds the threshold, the method includes setting the electrical tilt angle of the antenna array to:

$$\max(\min(\bar{\theta^m}, \bar{\theta^{m+1}} - \Delta\theta_{min}), \bar{\theta^{m-1}} + \Delta\theta_{min});$$

where $\bar{\theta^m}$ is the current electrical tilt angle of the sector, $\bar{\theta^{m-1}}$ is a current electrical tilt angle of an immediately precedent sector, $\bar{\theta^{m+1}}$ is a current electrical tilt angle of a next-subsequent sector and $\Delta\theta_{min}$ is a minimum angular spread between adjacent sectors.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 1 depicts an example of a two dimensional antenna array;

FIG. 7 is a flow chart illustrating exemplary methods implemented in a communication system including a host computer, a network node and a wireless device for executing a client application at a wireless device according to some embodiments of the present disclosure FIG. 8 is a flow chart illustrating exemplary methods implemented in a communication system including a host computer, a network node and a wireless device for receiving user data at a wireless device according to some embodiments of the present disclosure;

DETAILED DESCRIPTION

Figure 2:
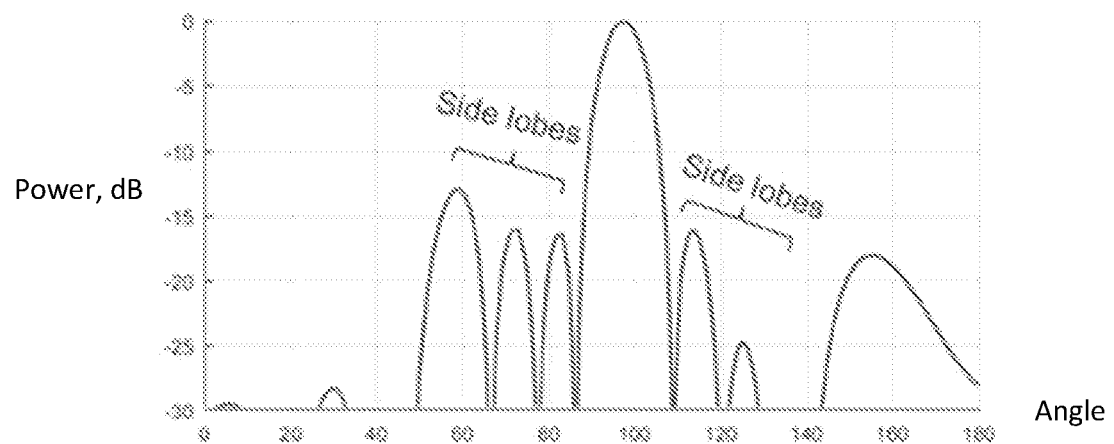
FIG. 2 depicts an example of a vertical beam pattern.

Before describing in detail exemplary embodiments, it is noted that the embodiments reside primarily in combinations of apparatus components and processing steps related to adaptive cell shaping in codebook based full dimension multiple input-multiple output configurations. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide an apparatus and method to dynamically adjust network node, e.g., base station, electrical tilt. In some embodiments, precoding matrix indicators (PMIs) reported by WDs will be used as input to an algorithm to measure WD distribution in a vertical direction. Rank indicator (RI) and channel quality index (CQI) feedback information can also be employed for additional flexibility. Thus, a method is proposed for a single vertical sector case to point electrical tilt to the WDs. Another method is proposed for the multiple vertical sector case by considering the minimum angular separation between sectors when adjusting tilt. The virtual sectors can also be created or removed dynamically based on the elevation angular coverage with minimum CSI-RS resources. When the codebook used by a sector in normal mode doesn't allow WDs to report vertical PMIs, a WD distribution period is proposed during which the codebook configured is switched to another codebook enabling vertical PMI reporting. The methods described above can also be applied to horizontal cell shaping.

With the proposed adaptive approach, the electrical tilt may be tuned dynamically to steer network node transmit power toward the WDs. At the same time, vertical sectors can be created and/or removed based on WD distribution to provide proper elevation coverage with minimum CSI-RS resources. System performance may be improved compared to those having a conventional fixed electrical tilt configuration.

A two-Dimensional (2D) active antenna system (AAS) is one of various key technologies adopted by 4G LTE and 5G New Radio (NR) to enhance the wireless network performance and capacity by using FD-MIMO. In a 2D AAS, antennas are placed in the elevation domain to provide additional degrees of freedom, which are effectively generated by elevation spread of the channels and the elevation angle distribution of WDs. A typical 2D directional antenna array is composed of M rows, N columns and two polarizations (cross-polarization) as shown in FIG. 1.

Figure 3:
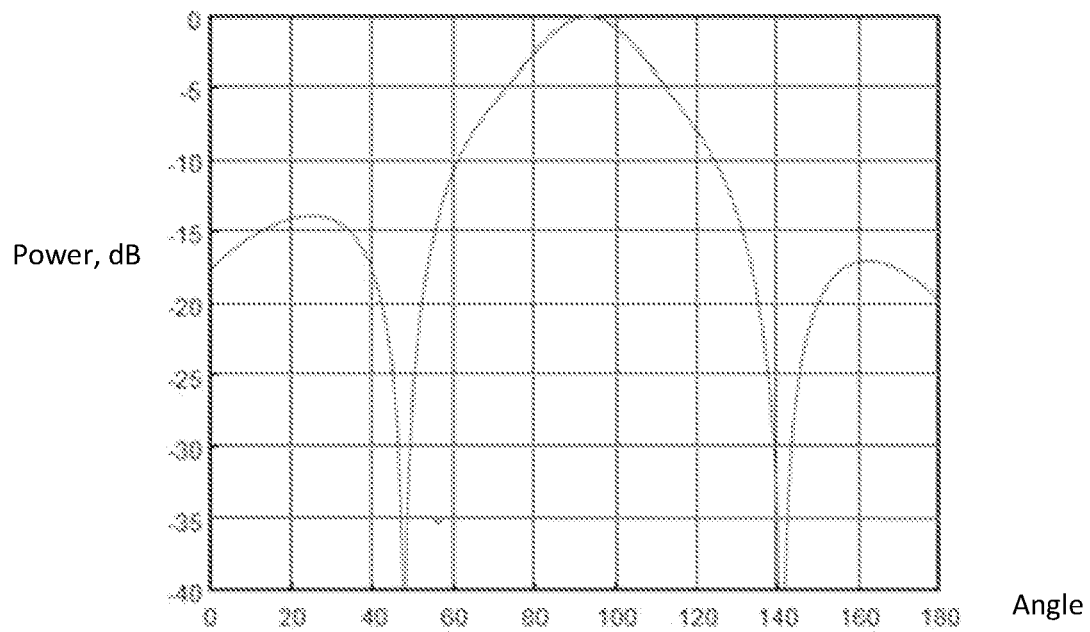
FIG. 3 depicts an example of a horizontal beam pattern.

The antennas in a 2D antenna array can be used to form one or multiple beam(s) in the horizontal direction and in the vertical direction. Each beam is allocated a CSI-RS resource containing a few CSI-RS ports. The shape of the beam is defined by the beamforming weights which map CSI-RS ports to physical antennas. Let $W_{p2a}^{H_m}$ be the port-to-antenna mapping weights for the m-th horizontal beam and $W_{p2a}^{V_n}$ be the port-to-antenna mapping weights for the n-th vertical beam. The shape of port to corresponding 2D beam is defined by 2D antenna mapping weights $W_{p2a}^{mn} = W_{p2a}^{H_m} \otimes W_{p2a}^{V_n}$. FIGS. 2 and 3 illustrate examples of a vertical beam and a horizontal beam, respectively.

Figure 4:
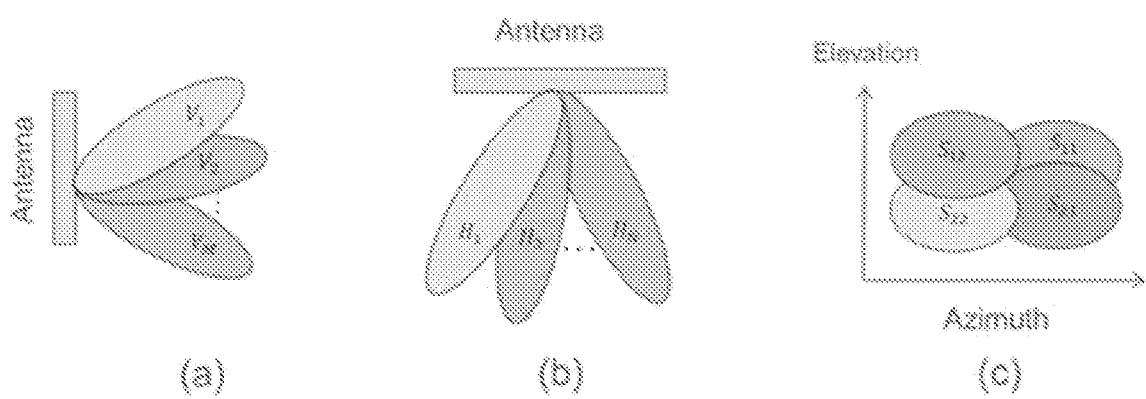
FIG. 4 depicts different views of sectors of an antenna array.

If in one direction, horizontal or vertical, multiple beams are formed, each beam in a direction being considered a virtual sector. FIG. 4 shows an example of vertical sectors (a), horizontal sectors (b), and 2D sectors (c).

In 3GPP LTE-advanced and in NR 5G standard, Discrete Fourier Transform (DFT) precoders are used for codebook-based beamforming. To construct the precoder vector for the 2D antenna array, a one-dimensional DFT precoder $w_h$ is defined to precode a single-layer transmission using a one row co-polarized uniform linear array (ULA) for horizontal antennas:

$$w_h(n) = \begin{bmatrix} 1 & e^{j\frac{2\pi n}{N_1 O_h}} & \cdots & e^{j\frac{2\pi n(N-1)}{N_1 O_h}} \end{bmatrix},$$

where n=0, 1, ..., $N_1-1$ is the precoder index and $O_h$ is an integer oversampling factor for horizontal direction.

Similarly, a one-dimensional DFT precoder $w_v$ is defined to precode a single-layer transmission using a one column co-polarized uniform linear array (ULA) for vertical antennas $$w_v(m) = \begin{bmatrix} 1 & e^{j\frac{2\pi m}{N_2 O_v}} & \cdots & e^{j\frac{2\pi m(N-1)}{N_2 O_v}} \end{bmatrix},$$

where m=0, 1, ..., $N_2-1$ is the precoder index and $O_v$ is the integer oversampling factor for vertical direction.

The corresponding precoder vector for a two-dimensional Uniform Planar Array (UPA) can be created by taking the Kronecker product of two precoder vectors as $w_{2D}(m,n) = w_h(n) \otimes w_v(m)$. Extending the precoder for a dual-polarized UPA may then be done as $$w_{2D,DP} = \begin{bmatrix} w_{2D} & 0 \\ 0 & w_{2D} \end{bmatrix} \begin{bmatrix} 1 \\ e^{j\phi} \end{bmatrix},$$

where $e^{j\emptyset}$ is a co-phasing factor between two orthogonal polarizations. A precoder matrix $w_{2D,DP}$ for multi-layer transmission may be created by appending columns of DFT precoder vectors as $$w_{2D,DP} = [w_{2D}(m_1, n_1, \emptyset_1) \; w_{2D}(m_2, n_2, \emptyset_2) \ldots w_{2D}(m_R, n_R, \emptyset_R)],$$

where R is the number of transmission layers, i.e. the transmission rank.

The optimal co-phasing $e^{j\emptyset_r}$ between polarizations for different layers typically vary over frequency while the optimal beam direction $w_{2D}(m,n)$ typically is the same over the whole frequency band for different layers. Thus, in the LTE and NR 5G codebooks, the precoder matrix is split up into a $W_1$ matrix factor for the beam direction which is selected on a wideband level, and a $W_2$ matrix factor for the polarization co-phasing, i.e., $$w_{2D,DP} = \begin{bmatrix} w_{2D} & 0 \\ 0 & w_{2D} \end{bmatrix} \begin{bmatrix} 1 & 1 & & 1 \\ e^{j\phi_1} & e^{j\phi_2} & \cdots & e^{j\phi_R} \end{bmatrix} = W_1 W_2.$$

When CSI-RS is precoded to form beams, the CQI, RI and PMI that WDs feedback to a base station in a CSI report are measured with precoded CSI-RS. Consequently, for each beam or subsector, the physical downlink shared channel (PDSCH) precoding weights for codebook-based beamforming will be $$w = w_{p2a} w_{2D,DP}$$

The port-to-antenna mapping matrix $w_{p2a}$ here behaves like an angular envelope for the beamformed signals.

The PMIs reported by WDs may basically contain the information of $W_1$ and $W_2$, i.e., m, n and co-phasing phases $\emptyset_i$, i=1,2, ..., R. The vertical and horizontal direction information are represented by m and n, respectively.

Figure 5:
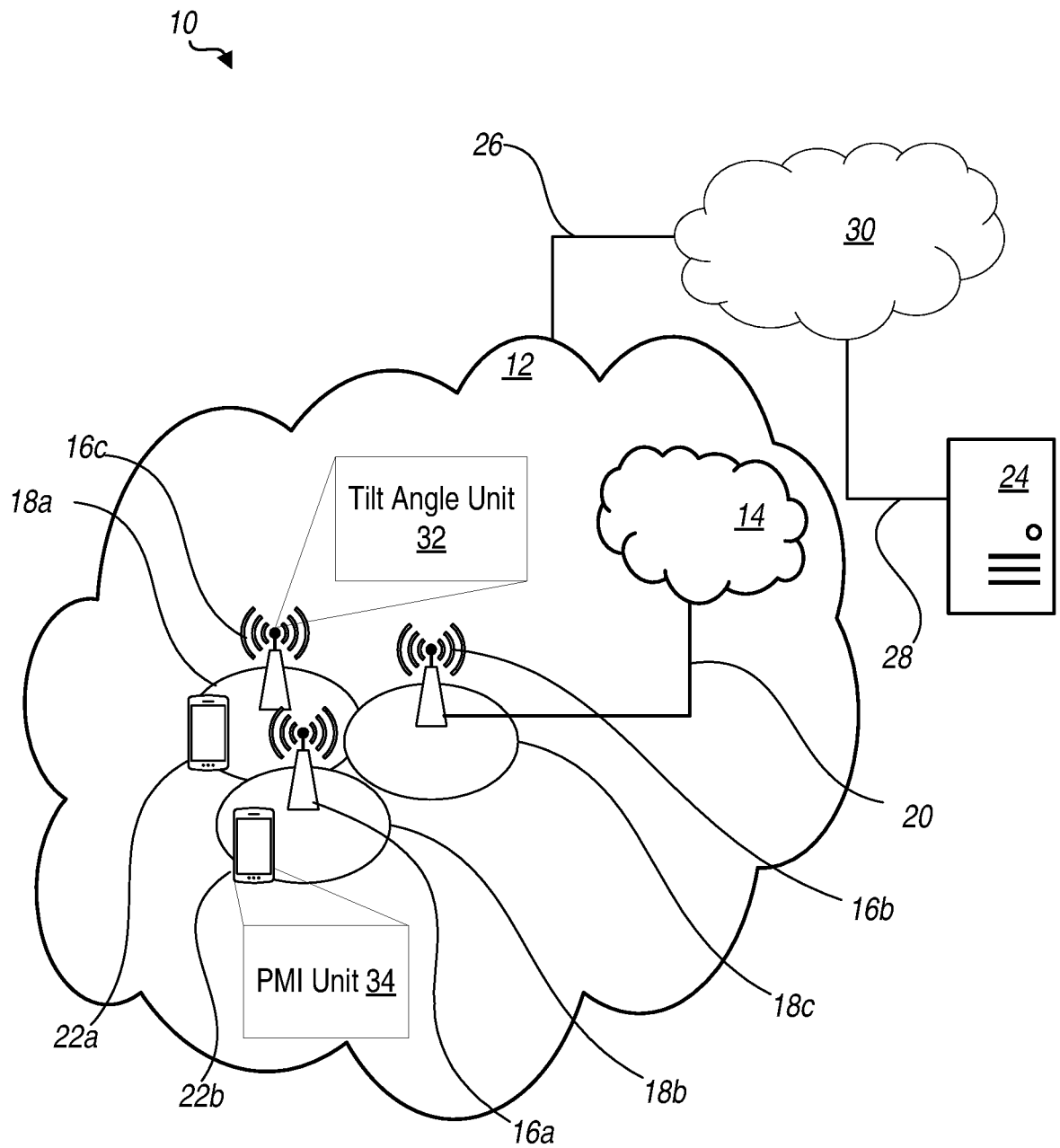
FIG. 5 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 5 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 may include a tilt angle unit 32 which is configured to set an electrical tilt of an antenna array toward a distribution of wireless devices 22. A wireless device 22 may include a PMI unit 34 which is configured to transmit a PMI to a base station.

Example implementations, in accordance with an embodiment, of the WD 22, network node 16 and host computer 24 discussed in the preceding paragraphs will now be described with reference to FIG. 6. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include tilt angle unit 32 configured to adapt an electrical tilt of an antenna array toward a distribution of WDs 22.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a PMI unit 34 configured to transmit PMIs to the network node 16.

Figure 6:
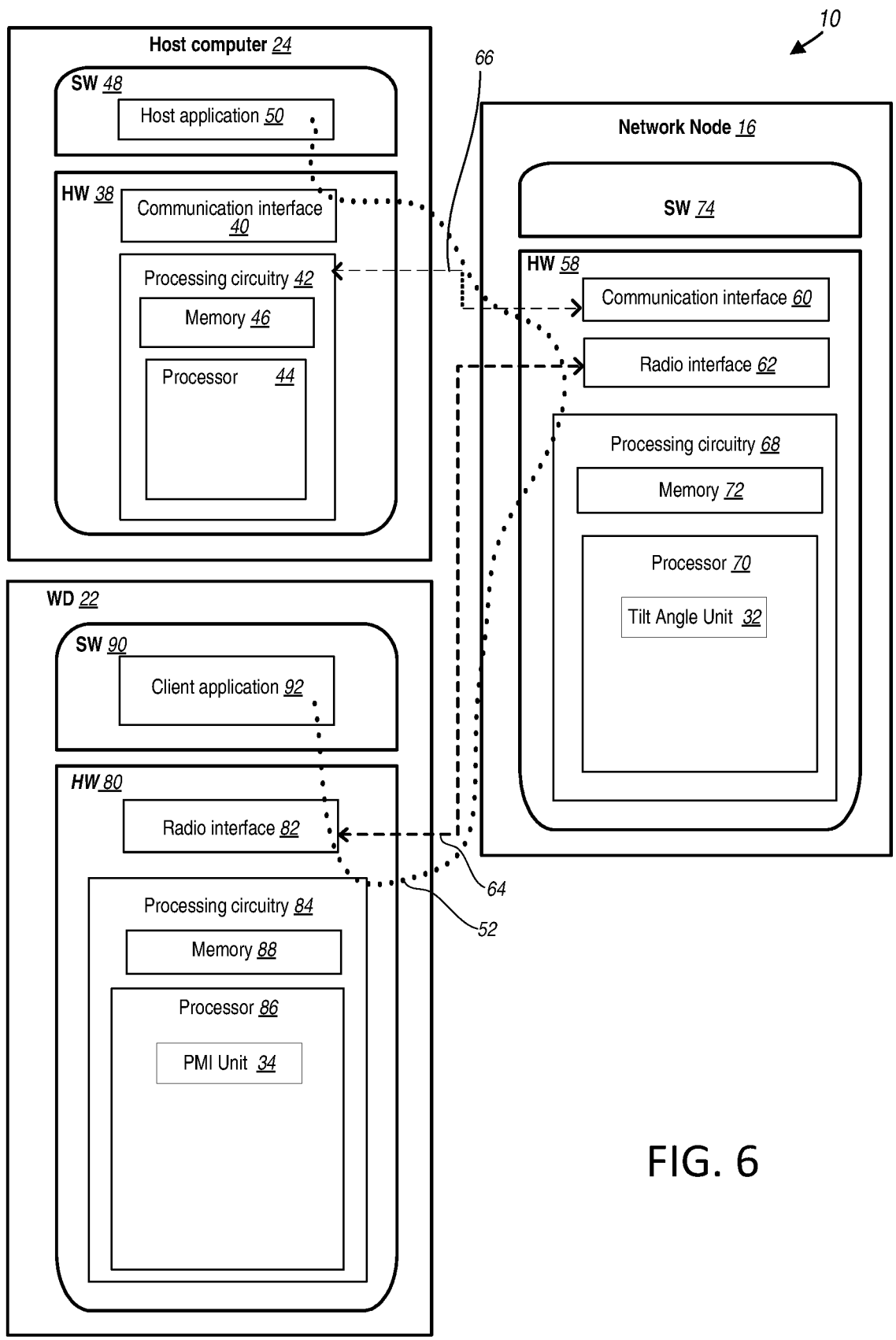
FIG. 6 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 5 and 6 show various "units" such as tilt angle unit 32, and PMI unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 7 is a flowchart illustrating an exemplary method implemented in a communication system, such as, for example, the communication system of FIGS. 5 and 6, in accordance with one embodiment. The communication system may include a host computer 24, a network node 16 and a WD 22, which may be those described with reference to FIG. 6. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 92, associated with the host application 50 executed by the host computer 24 (block S108).

FIG. 8 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figure 9:
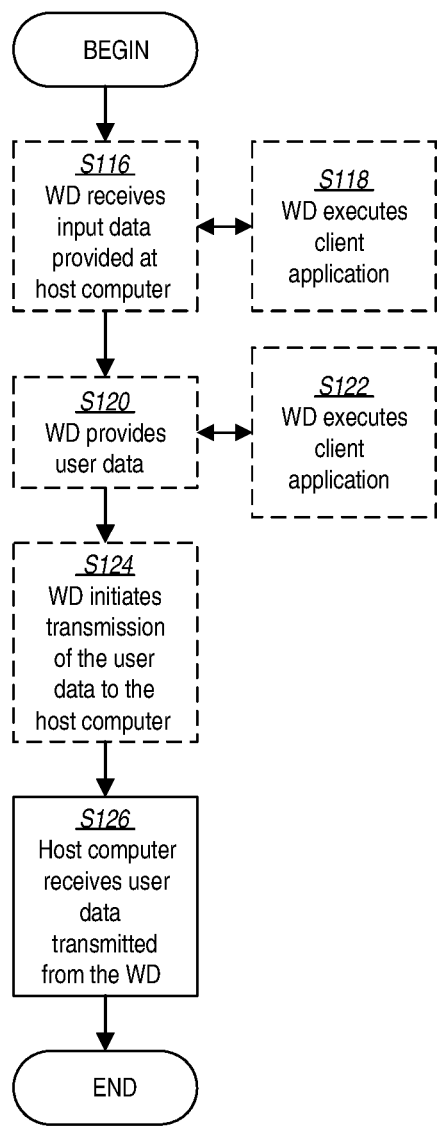
FIG. 9 is a flow chart illustrating exemplary methods implemented in a communication system including a host computer, a network node and a wireless device for receiving user data from the wireless device at a host computer according to some embodiments of the present disclosure.

FIG. 9 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

Figure 10:
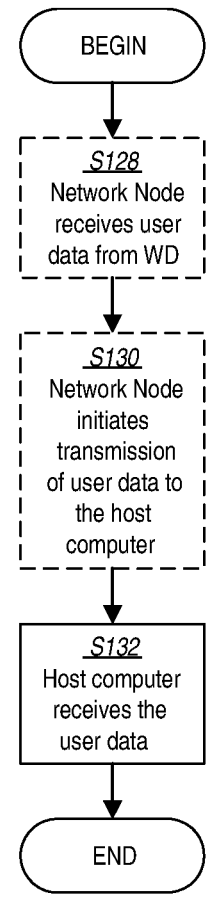
FIG. 10 is a flow chart illustrating exemplary methods implemented in a communication system including a host computer, a network node and a wireless device for receiving user data at a host computer according to some embodiments of the present disclosure.

FIG. 10 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 11:
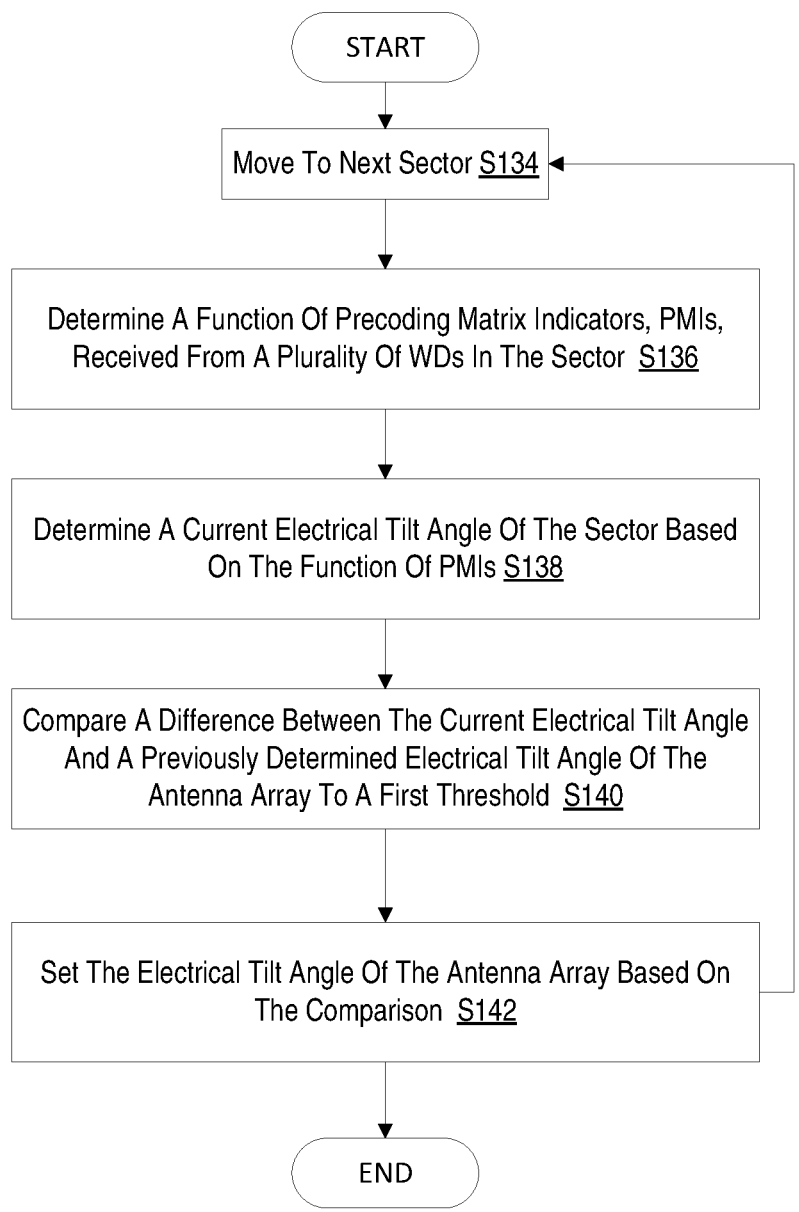
FIG. 11 is a flowchart of an exemplary process for adapting an electrical tilt of an antenna array toward a distribution of wireless devices.

FIG. 11 is a flowchart of an exemplary process in a network node 16 for setting an electrical tilt of an antenna array toward a distribution of WDs 22. The process includes, for each of at least one sector (block S134), determining, via the processing circuitry 68, a function of precoding matrix indicators, PMIs, received from a plurality of WDs in the sector (block S136). The process also includes determining, via the tilt angle unit 32, a current electrical tilt angle of the sector based on the function of PMIs (block S138). The process further includes comparing, via the tilt angle unit 32, a difference between the current electrical tilt angle and a previously determined electrical tilt angle to a first threshold (block S140). The process also includes setting, via the tilt angle unit 32, a tilt angle based on the comparison (block S142).

Having described the general process flow of arrangements of the disclosure and having provided examples of hardware and software arrangements for implementing the processes and functions of the disclosure, the sections below provide details and examples of arrangements for adaptively determining the electrical tilt angle of an antenna array.

As mentioned above, incorrectly configured electrical tilt may result in poor performance for elevation beamforming. The present disclosure proposes to dynamically adjust electrical tilt based on WD PMI feedback to improve system performance as compared with known systems.

Figure 12:
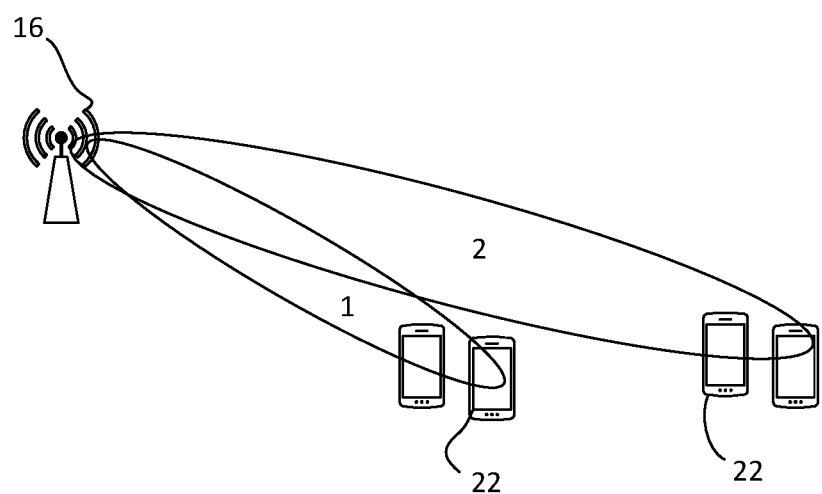
FIG. 12 is an illustration of a base station emitting a plurality of beams to WD distributions.
Figure 13:
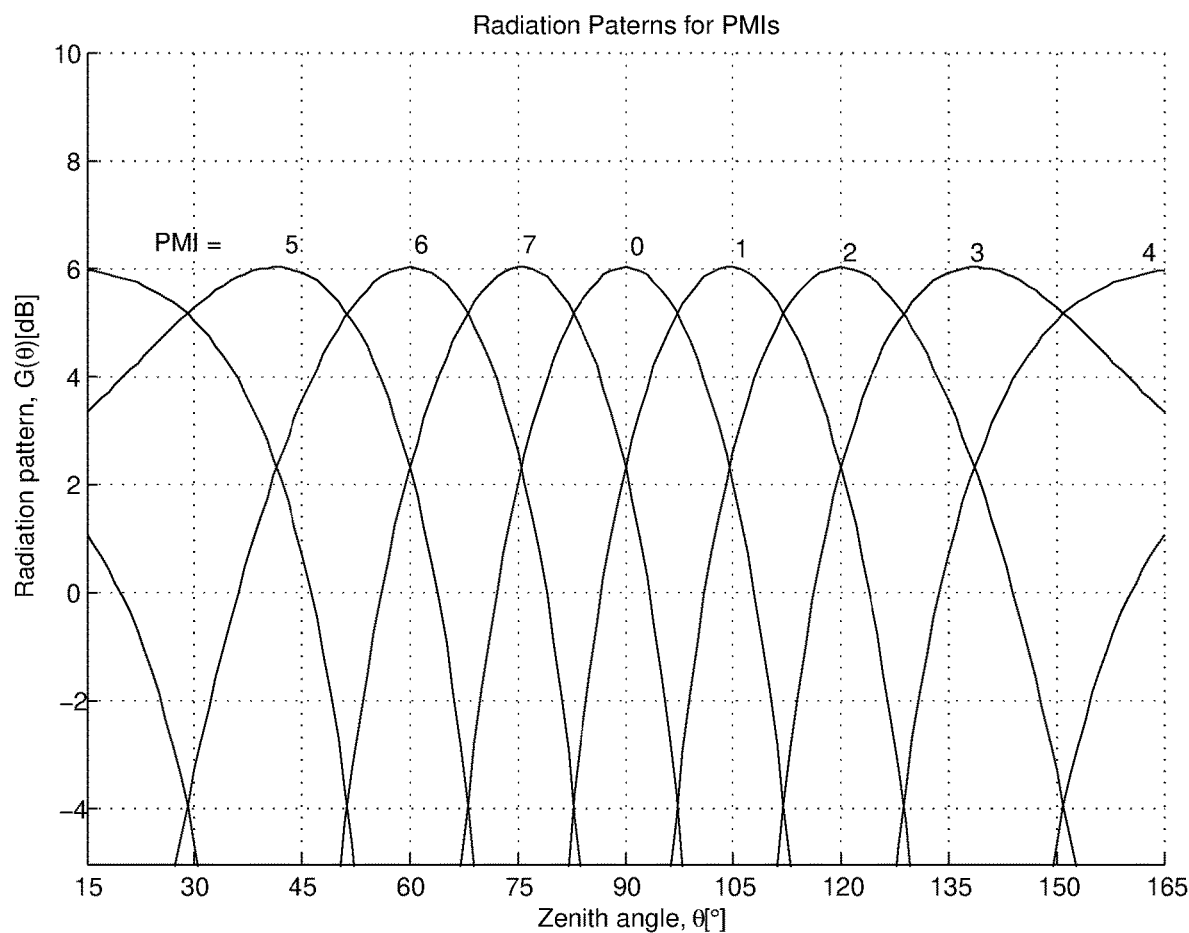
FIG. 13 shows radiation patterns for PMIs for the vertical direction.

FIG. 12 is an illustration of a base station 16 emitting a plurality of beams 1 and 2 to distributions of WDs 22. Each beam is considered a different sector. Some embodiments control the angular direction of each beam 1 and 2. FIG. 13 shows the physical downlink shared channel (PDSCH) signal radiation patterns of the vertical direction with N=2 and $O_v=4$. FIG. 13 shows that the PDSCH radiation patterns with different m values point to different vertical directions. Hence, the WD angular distribution information can be obtained by analyzing the PMIs that are reported by the WDs.

Single Vertical Sector Case

Figure 14:
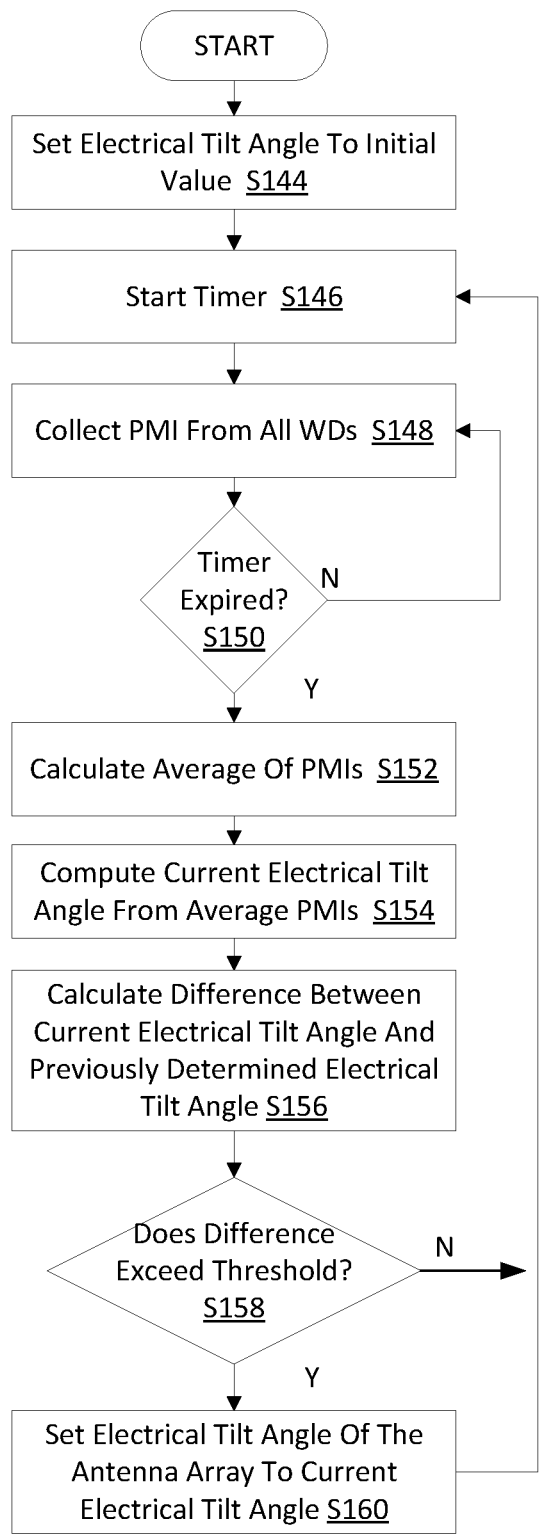
FIG. 14 is a flowchart of an algorithm for adaptive electrical tilt adjustment for a single vertical sector.

The flowchart in FIG. 14 shows an example method for adaptive electrical tilt adjustment for a single vertical virtual sector case. The method includes the following steps:

Method 1: Adaptive Electrical Tilt Adjustment for Single Vertical Sector
1. Set electrical tilt to initial tilt $\theta_0$; (block S144)
2. Start a timer which determines the periodicity of tilt evaluation; (block S146)
3. Collect PMIs from all WDs 22. Denote all PMIs received as X; (block S148)
4. When the timer expires (block S150), calculate the average of PMIs $f(X)$ (block S152). Different concepts of average in statistics such as mean, median, midrange, etc., can be used to calculate $f(X)$;
5. Determine the current desired vertical angles $\hat{\theta}$ of WDs 22 based on $f(X)$; (block S154). Note that each PMI may correspond to a zenith angle. If the average of PMIs is fractional, the corresponding angle can be obtained by interpolation.
6. Calculate the difference between current tilt and desired vertical angle; (block S156);
7. If the difference between current tilt and desired vertical angles of WDs 22 is larger than a threshold $T_1$ (block S158) then set the electrical tilt to $\hat{\theta}$; (block S160); and
8. Go to restart a new period.

Multiple Vertical Sector Case

In cases where there are several vertical sectors, when a WD 22 reports CSI, the WD 22 will also report a CSI-RS Resource Indication (CRI) which indicates the best sector for this WD 22. To ensure that two sectors don't overlap, each sector may be configured with a specific initial electrical tilt which satisfies a minimum angular separation $\Delta\theta_{min}$ with other sectors. Assuming that the sectors are indexed in increasing order from top sector to bottom sector, the initial tilt configurations for sectors may satisfy $$\theta_0^m \geq \theta_0^{m-1} + \Delta\theta_{min}$$

where $\theta_0^m$, m=1,2, . . . , $S_v$ is the initial electrical tilt for vertical sector m and $S_v$ is the number of vertical sectors.

Similar conditions may be added into an adaptive tilt adjustment algorithm to achieve this minimum angular separation. It is assumed that the adaptive tilt adjustment is done from top sector to bottom sector.

Method 2: Adaptive Electrical Tilt Adjustment for Multiple Vertical Sectors
1. For each sector m, m=1,2, . . . , $S_v$, set initial electrical tilt to $\theta_0^m$; (block S162)
2. Start a timer for each sector which determines the periodicity of tilt evaluation (block S164). The start times of timers for different sectors don't need to be the same but the order of start is preferable to be from top sector to bottom sector, i.e., from sector 1 to sector $S_v$, or from bottom to the top, i.e., from sector $S_v$ to sector 1;
3. For each sector, collect PMIs from all WDs 22 served by that sector. Denote all PMIs received in sector m as $X_m$; (block S166)
4. When the timer for sector m expires (block S168), calculate the average of PMIs $f(X_m)$ (block S170). Different concepts of average in statistics such as mean, median, midrange, etc., can be used to calculate $f(X_m)$;
5. For corresponding sector, determine the desired vertical angles $\hat{\theta^m}$ of WDs 22 based on mean $f(X_m)$; (block S172)
6. Calculate the difference between current tilt and desired vertical angles of WDs 22 (block S174)
7. If the difference between current tilt and desired vertical angles of WDs 22 for sector m is larger than a threshold $T_1$ (block S176), then set the electrical tilt to max(min ($\hat{\theta^m}, \hat{\theta^{m+1}} - \Delta\theta_{min}$), $\hat{\theta^{m-1}} + \Delta\theta_{min}$); (block S178) and
8. Go to restart a new period.

Figure 15:
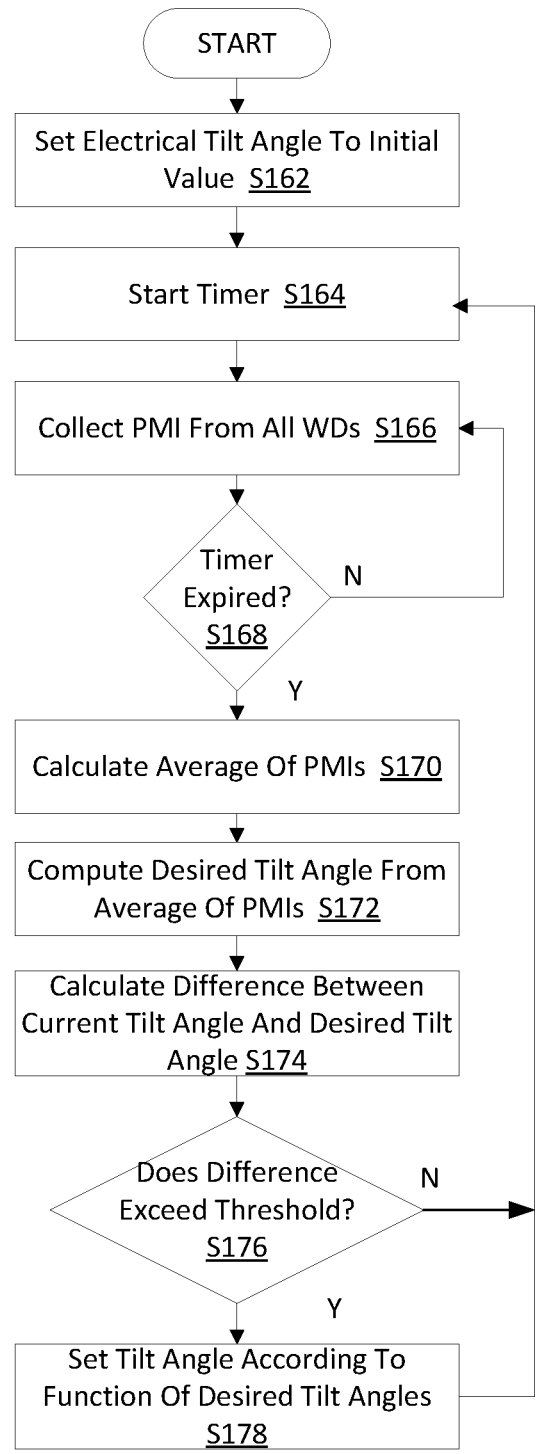
FIG. 15 is a flowchart of an algorithm for adaptive electrical tilt adjustment for a plurality of vertical sectors.

The flow chart in FIG. 15 illustrates the adaptive tilt adjustment algorithm for the multiple vertical sector case.

Dynamic Vertical Sector Creation and Removal

In the adaptive electrical tilt adjustment process for multiple vertical sectors, when the angular separation between immediate upper sector m−1 and immediate lower sector m+1 becomes too small, the current sector m can be removed as sectors become too overlapped. This can be described as: if $\theta^{m+1} - \theta^{m-1} <$ a threshold $T_2$, then remove sector m, for m=2, . . . , $S_v$−1.

Furthermore, when two adjacent sectors become too separated, there will be a coverage gap between two sectors. In this case, a new sector could be added between these two sectors to fill the coverage gap. This can be described as: if $\theta^{m+1} - \theta^m >$ a threshold $T_3$, for m=1, 2, . . . , $S_v$−1 and $\theta_1 = 0°$ and $\theta_{S_v} = 180°$, then a new sector may be created, and a new CSI-RS resource will be allocated for this new sector. The number of PMIs received can also be considered when adding a new sector, i.e., a new sector is created only if the number of PMIs received exceeds a threshold $T_4$ from the area covered by to-be created sector.

Sector Reshaping and Splitting

If the spread of tilts corresponding to the PMIs within a sector increases but remains below a threshold $T_5$, the sector beam can be reshaped to match the beam with the tilt spread of the PMIs. Sector splitting is performed when the spread of the PMIs exceeds the threshold $T_5$. For sector splitting, the PMIs are classified into L sets (such as by using a classification method), and the original sector is replaced by L sectors, each directed towards one of the average directions of PMI sets.

No Vertical PMI Case

For some codebooks defined by the 3GPP wireless communication standards, WDs 22 will not report PMI in the vertical direction. For example, Table 1 shows the codebooks defined in 3GPP Technical Specification (TS) 38.214 Table 5.2.2.2.1-2, where N1 and N2 are the number of CSI-RS ports in directions 1 and 2, respectively, and O1 and O2 are the discrete Fourier transform oversampling rates in directions 1 and 2 respectively. It is noted that direction 1 can be the horizontal direction and direction can be the vertical direction, or vice versa. For the codebooks in Table 1, if $N_2=1$ and $N_2$ is mapped to the vertical direction, then WDs 22 will not report vertical PMI. In this case, to get WD 22 distribution information in the vertical direction, WD 22 distribution measurement periods during which the codebook configuration is switched to a configuration with $N_2 \neq 1$ are configured. For example, the codebook used in normal mode is $(N_1, N_2)=(8, 1)$. In a WD 22 distribution measuring period, the codebook can be switched to $(N_1, N_2)=(4, 2)$ so that WDs 22 will report vertical PMI to provide WD distribution information in the vertical direction.

TABLE 1

| Number of CSI-RS antenna ports, $P_{CSI-RS}$ | $(N_1, N_2)$ | $(O_1, O_2)$ |
|---|---|---|
| 4 | (2, 1) | (4, 1) |
| 8 | (2, 2) | (4, 4) |
|   | (4, 1) | (4, 1) |
| 12 | (3, 2) | (4, 4) |
|   | (6, 1) | (4, 1) |
| 16 | (4, 2) | (4, 4) |
|   | (8, 1) | (4, 1) |
| 24 | (4, 3) | (4, 4) |
|   | (6, 2) | (4, 4) |
|   | (12, 1) | (4, 1) |
| 32 | (4, 4) | (4, 4) |
|   | (8, 2) | (4, 4) |
|   | (16, 1) | (4, 1) |

The vertical tilt adjustments, creation, removal and/or reshaping can be made either locally at the transmitter or in the network 12, i.e., the cloud.

According to one aspect, a method in a network node 16 for setting an electrical tilt of an antenna array toward a distribution of WDs 22 is provided. The method includes: for each of at least one sector of an area covered by the antenna array, determining (block S136) a function of precoding matrix indicators, PMIs, received from a plurality of WDs 22 in the sector. The method also includes determining (block S138) a current electrical tilt angle of the sector based on the function of PMIs. The method also includes comparing (block S140) a difference between the current electrical tilt angle of the sector and a previously determined electrical tilt angle of the antenna array to a first threshold, and setting (block S142) the electrical tilt angle of the antenna array based on the comparison.

According to this aspect, in some embodiments, when there is only one sector and the difference exceeds the first threshold, the electrical tilt angle of the antenna array is set to the current electrical tilt angle of the sector. In some embodiments, when the difference exceeds the first threshold, the electrical tilt angle of the antenna array is set to:

$$\max(\min(\overline{\theta^m}, \overline{\theta^{m+1}} - \Delta\theta_{min}), \overline{\theta^{m-1}} + \Delta\theta_{min});$$

where $\overline{\theta^m}$ is the current electrical tilt angle of the current sector, $\overline{\theta^{m-1}}$ is a current electrical tilt angle of an immediately precedent sector, $\overline{\theta^{m+1}}$ is a current electrical tilt angle of a next-subsequent sector and $\Delta\theta_{min}$ is a minimum angular spread between adjacent sectors. In some embodiments, the function of PMIs is one of an average and a median of the PMIs. In some embodiments, a timer is set for each sector to time an evaluation period for receiving the PMIs and determining the current electrical tilt angle for each sector. In some embodiments, when an angular separation between a sector immediately preceding a current sector and a sector immediately subsequent to the current sector is less than a second threshold, the current sector is removed from a group of sectors to which beams are steered. In some embodiments, when an angular separation between two adjacent sectors exceeds a third threshold, a sector between the two adjacent sectors is added. In some embodiments, a beam of a sector is reshaped as a spread between two adjacent distributions of WDs 22 increases. In some embodiments, a beam of a sector is split when a spread between two adjacent distributions of WDs 22 exceeds a fourth threshold. In some embodiments, when a WD 22 is configured with a codebook for which PMI is not reported in a vertical direction, the method further includes switching the codebook configuration during a PMI measuring period to a codebook configuration for which PMI is reported in the vertical direction.

According to another aspect, a network node 16 for setting an electrical tilt of an antenna array toward a distribution of WDs 22 is provided. The network node 16 includes processing circuitry 68 configured to, for each of at least one sector of an area covered by the antenna array, determine a function of precoding matrix indicators, PMIs, received from a plurality of WDs 22 in the sector. The processing circuitry is further configured to determine a current electrical tilt angle of the sector based on the function of PMIs. The processing circuitry 68 is further configured to compare a difference between the current electrical tilt angle of the sector and a previously determined electrical tilt angle of the sector to a first threshold, and set the electrical tilt angle of the sector based on the comparison.

According to this aspect, in some embodiments, when there is only one sector and the difference exceeds the first threshold, the electrical tilt angle of the antenna array is set to the current electrical tilt angle of the sector. In some embodiments, when the difference exceeds the first threshold, the electrical tilt angle of the antenna array is set to:

$$\max(\min(\overline{\theta^m}, \overline{\theta^{m+1}} - \Delta\theta_{min}), \overline{\theta^{m-1}} + \Delta\theta_{min});$$

where $\overline{\theta^m}$ is the current electrical tilt angle of the current sector, $\overline{\theta^{m-1}}$ is a current electrical tilt angle of an immediately precedent sector, $\overline{\theta^{m+1}}$ is a current electrical tilt angle of a next-subsequent sector and $\Delta\theta_{min}$ is a minimum angular spread between adjacent sectors. In some embodiments, the function of PMIs is one of an average and a median of the PMIs. In some embodiments, a timer is set for each sector to time an evaluation period for receiving the PMIs and determining the current electrical tilt angle for each sector. In some embodiments, when an angular separation between a sector immediately preceding a current sector and a sector immediately subsequent to the current sector is less than a second threshold, the current sector is removed from a group of sectors to which beams are steered. In some embodiments, when an angular separation between two adjacent sectors exceeds a third threshold, a sector between the two adjacent sectors is added. In some embodiments, a beam of a sector is reshaped as a spread between two adjacent distributions of WDs 22 increases. In some embodiments, a beam of a sector is split when a spread between two adjacent distributions of WDs 22 exceeds a fourth threshold. In some embodiments, when a WD 22 is configured with a codebook for which PMI is not reported in a vertical direction, the processing circuitry is further configured to cause the WD 22 to switch the codebook configuration during a PMI measuring period to a codebook configuration for which PMI is reported in the vertical direction.

According to another aspect, a computer storage device storing a computer program that, when executed by at least one processor in a network node 16, performs some methods set forth herein is provided.

According to yet another aspect, a method in a network node 16 for adapting an electrical tilt of an antenna array toward a distribution of WDs 22 is provided. The method includes for each of M sectors, $S_1$ to $S_m$ of an area covered by the antenna array: starting (block S164) a timer, collecting (block S166) precoding matrix indicators, PMIs, $X_m$, from a plurality of WDs 22 served by the sector. The method further includes, when the timer expires (block S168), calculating (block S170) a function, $f(X_m)$ of the PMIs, determining (block S172) a current electrical tilt angle $\overline{\theta^m}$ of the sector based on the function $f(X_m)$, and comparing (block S174) a difference between the current electrical tilt angle $\overline{\theta^m}$ and a previously determined electrical tilt angle of the antenna array to a threshold. When the difference exceeds the threshold (block S176), the method includes setting (block S178) the electrical tilt angle of the antenna array to:

$$\max(\min(\overline{\theta^m}, \overline{\theta^{m+1}} - \Delta\theta_{min}), \overline{\theta^{m-1}} + \Delta\theta_{min});$$

where $\overline{\theta^m}$ is the current electrical tilt angle of the sector, $\overline{\theta^{m-1}}$ is a current electrical tilt angle of an immediately precedent sector, $\overline{\theta^{m+1}}$ is a current electrical tilt angle of a next-subsequent sector and $\Delta\theta_{min}$ is a minimum angular spread between adjacent sectors.

According to another aspect, a network node 16 for adapting an electrical tilt of an antenna array toward a distribution of WDs 22. The network node 16 includes processing circuitry 68 configured to, for each of M sectors, $S_1$ to $S_m$ of an area covered by the antenna array: start a timer, and collect precoding matrix indicators, PMIs, $X_m$, from a plurality of WDs 22 served by the sector. When the timer expires, the method includes calculating a function, $f(X_m)$ of the PMIs; determining a current electrical tilt angle $\overline{\theta^m}$ of the sector based on the function $f(X_m)$; and comparing a difference between the current electrical tilt angle $\overline{\theta^m}$ and a previously determined electrical tilt angle of the antenna array to a threshold. When the difference exceeds the threshold, the method includes setting the electrical tilt angle of the antenna array to:

$$\max(\min(\overline{\theta^m}, \overline{\theta^{m+1}} - \Delta\theta_{min}), \overline{\theta^{m-1}} + \Delta\theta_{min});$$

where $\overline{\theta^m}$ is the current electrical tilt angle of the sector, $\overline{\theta^{m-1}}$ is a current electrical tilt angle of an immediately precedent sector, $\overline{\theta^{m+1}}$ is a current electrical tilt angle of a next-subsequent sector and $\Delta\theta_{min}$ is a minimum angular spread between adjacent sectors.

Abbreviation Explanation
eNB E-UTRAN Node B, also known as Evolved Node B
gNB Next Generation NodeB used to name 5G NR base station
MIMO Multiple-Input and Multiple-Output
FD-MIMO Full Dimension Multiple-Input and Multiple-Output
PMI Precoding Matrix Indicator As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C"

programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node for setting an electrical tilt of an antenna array toward a distribution of wireless devices, WDs, the method comprising:
   for each of at least one sector of an area covered by the antenna array:
      determining a function of precoding matrix indicators, PMIs, received from a plurality of WDs in the sector;
      determining a current electrical tilt angle of the sector based on the function of PMIs;
      comparing a difference between the current electrical tilt angle of the sector and a previously determined electrical tilt angle of the antenna array to a first threshold; and
      setting the electrical tilt angle of the antenna array based on the comparison.

2. The method of claim 1, wherein, when there is only one sector and the difference exceeds the first threshold, the electrical tilt angle of the antenna array is set to the current electrical tilt angle of the sector.

3. The method of claim 1, wherein, when the difference exceeds the first threshold, the electrical tilt angle of the antenna array is set to:

$$\max(\min(\bar{\theta}^m, \bar{\theta}^{m+1} - \Delta\theta_{min}), \bar{\theta}^{m-1} + \Delta\theta_{min});$$

where $\bar{\theta}^m$, $\bar{\theta}^{m+1}$ is the current electrical tilt angle of the current sector, $\bar{\theta}^{m-1}$ is a current electrical tilt angle of an immediately precedent sector, $\bar{\theta}^{m+1}$ is a current electrical tilt angle of a next-subsequent sector and $\Delta\theta_{min}$ is a minimum angular spread between adjacent sectors.

4. The method of claim 1, wherein the function of PMIs is one of an average and a median of the PMIs.

5. The method of claim 1, wherein a timer is set for each sector to time an evaluation period for receiving the PMIs and determining the current electrical tilt angle for each sector.

6. The method of claim 1, wherein, when an angular separation between a sector immediately preceding a current sector and a sector immediately subsequent to the current sector is less than a second threshold, the current sector is removed from a group of sectors to which beams are steered.

7. The method of claim 1, wherein, when an angular separation between two adjacent sectors exceeds a third threshold, a sector between the two adjacent sectors is added.

8. The method of claim 1, wherein a beam of a sector is reshaped as a spread between two adjacent distributions of WDs increases.

9. The method of claim 1, wherein a beam of a sector is split when a spread between two adjacent distributions of WDs exceeds a fourth threshold.

10. The method of claim 1, wherein, when a WD is configured with a codebook for which PMI is not reported in a vertical direction, the method further includes switching the codebook configuration during a PMI measuring period to a codebook configuration for which PMI is reported in the vertical direction.

11. A network node for setting an electrical tilt of an antenna array toward a distribution of wireless devices, WDs, the network node comprising:
   processing circuitry configured to, for each of at least one sector of an area covered by the antenna array:
      determine a function of precoding matrix indicators, PMIs, received from a plurality of WDs in the sector;
      determine a current electrical tilt angle of the sector based on the function of PMIs;
      compare a difference between the current electrical tilt angle of the sector and a previously determined electrical tilt angle of the sector to a first threshold; and
      set the electrical tilt angle of the sector based on the comparison.

12. The network node of claim 11, wherein, when there is only one sector and the difference exceeds the first threshold, the electrical tilt angle of the antenna array is set to the current electrical tilt angle of the sector.

13. The network node of claim 11, wherein, when the difference exceeds the first threshold, the electrical tilt angle of the antenna array is set to:

$$\max(\min(\bar{\theta}^m, \bar{\theta}^{m+1}, \bar{\theta}^{m-1} - \Delta\theta_{min}), \bar{\theta}^{m-1} + \Delta\theta_{min});$$

where $\bar{\theta}^m$, $\bar{\theta}^{m+1}$ is the current electrical tilt angle of the current sector, $\bar{\theta}^{m-1}$ is a current electrical tilt angle of an immediately precedent sector, $\bar{\theta}^{m+1}$ is a current electrical tilt angle of a next-subsequent sector and $\Delta\theta_{min}$ is a minimum angular spread between adjacent sectors.

14. The network node of claim 11, wherein the function of PMIs is one of an average and a median of the PMIs.

15. The network node of claim 11, wherein a timer is set for each sector to time an evaluation period for receiving the PMIs and determining the current electrical tilt angle for each sector.

16. The network node of claim 11, wherein, when an angular separation between a sector immediately preceding a current sector and a sector immediately subsequent to the current sector is less than a second threshold, the current sector is removed from a group of sectors to which beams are steered.

17. The network node of claim 11, wherein, when an angular separation between two adjacent sectors exceeds a third threshold, a sector between the two adjacent sectors is added.

18. The network node of claim 11, wherein a beam of a sector is reshaped as a spread between two adjacent distributions of WDs increases.

19. The network node of claim 11, wherein a beam of a sector is split when a spread between two adjacent distributions of WDs exceeds a fourth threshold.

20. The network node of claim 11, wherein, when a WD is configured with a codebook for which PMI is not reported in a vertical direction, the processing circuitry is further configured to cause the WD to switch the codebook configuration during a PMI measuring period to a codebook configuration for which PMI is reported in the vertical direction.

21. A non-transitory computer storage device storing a computer program that, when executed by at least one processor in a network node, performs a method for setting an electrical tilt of an antenna array toward a distribution of wireless devices, WDs, the method comprising:
for each of at least one sector of an area covered by the antenna array:
determining a function of precoding matrix indicators, PMIs, received from a plurality of WDs in the sector;
determining a current electrical tilt angle of the sector based on the function of PMIs;
comparing a difference between the current electrical tilt angle of the sector and a previously determined electrical tilt angle of the antenna array to a first threshold; and
setting the electrical tilt angle of the antenna array based on the comparison.

22. A method in a network node for adapting an electrical tilt of an antenna array toward a distribution of wireless devices, WDs, the method comprising:
for each of M sectors, $S_1$ to $S_m$ of an area covered by the antenna array:
starting a timer;
collecting precoding matrix indicators, PMIs, $X_m$, from a plurality of WDs served by the sector;
when the timer expires, calculating a function, $f(X_m)$ of the PMIs;
determining a current electrical tilt angle $\overline{\theta^m}, \overline{\theta^{m+1}}$ of the sector based on the function $f(X_m)$;
comparing a difference between the current electrical tilt angle $\overline{\theta^m}, \overline{\theta^{m+1}}$ and a previously determined electrical tilt angle of the antenna array to a threshold; and
when the difference exceeds the threshold, setting the electrical tilt angle of the antenna array to:

$$\max(\min(\overline{\theta^m}, \overline{\theta^{m+1}}, \overline{\theta^{m-1}} - \Delta\theta_{min}), \overline{\theta^{m-1}} + \Delta\theta_{min});$$

where $\overline{\theta^m}, \overline{\theta^{m+1}}$ is the current electrical tilt angle of the sector, $\overline{\theta^{m-1}}$ is a current electrical tilt angle of an immediately precedent sector, $\overline{\theta^{m+1}}$ is a current electrical tilt angle of a next-subsequent sector and $\Delta\theta_{min}$ is a minimum angular spread between adjacent sectors.

23. A network node for adapting an electrical tilt of an antenna array toward a distribution of wireless devices, WDs, the network node comprising:
processing circuitry configured to, for each of M sectors, $S_1$ to $S_m$ of an area covered by the antenna array:
start a timer;
collect precoding matrix indicators, PMIs, $X_m$, from a plurality of WDs served by the sector;
when the timer expires, calculate a function, $f(X_m)$ of the PMIs;
determine a current electrical tilt angle $\overline{\theta^m}, \overline{\theta^{m+1}}$ of the sector based on the function $f(X_m)$;
compare a difference between the current electrical tilt angle $\overline{\theta^m}, \overline{\theta^{m+1}}$ and a previously determined electrical tilt angle of the antenna array to a threshold; and
when the difference exceeds the threshold, set the electrical tilt angle of the antenna array to:

$$\max(\min(\overline{\theta^m}, \overline{\theta^{m+1}}, \overline{\theta^{m-1}} - \Delta\theta_{min}), \overline{\theta^{m-1}} + \Delta\theta_{min});$$

where $\overline{\theta^m}, \overline{\theta^{m+1}}$ is the current electrical tilt angle of the sector, $\overline{\theta^{m-1}}$ is a current electrical tilt angle of an immediately precedent sector, $\overline{\theta^{m+1}}$ is a current electrical tilt angle of a next-subsequent sector and $\Delta\theta_{min}$ is a minimum angular spread between adjacent sectors.

* * * * *